G. R. FORD.
DISPLAY STAND.
APPLICATION FILED JULY 29, 1908.
910,659.
Patented Jan. 26, 1909.
Fig. 1.
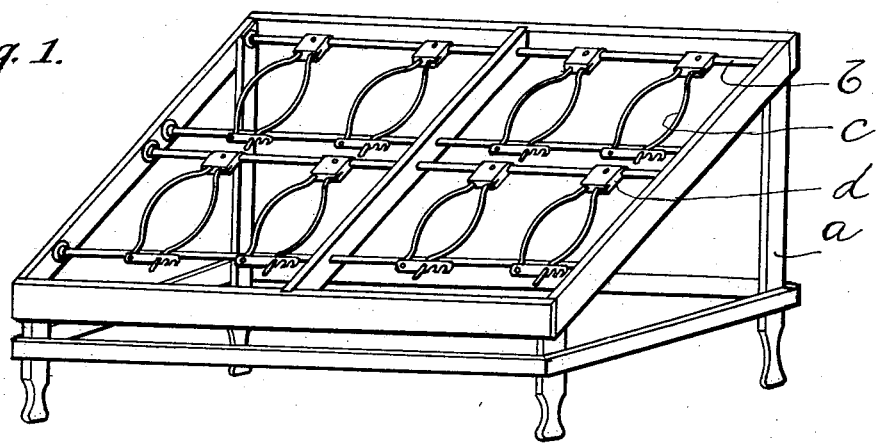
Fig. 2.
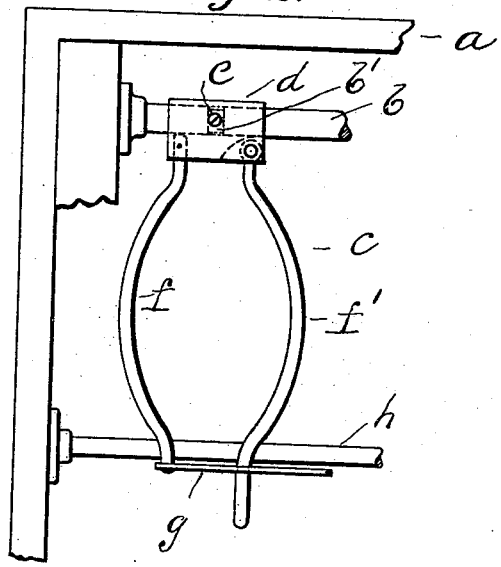
Fig. 3.
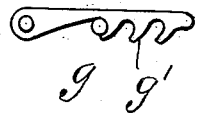
Fig. 4.
Fig. 5.
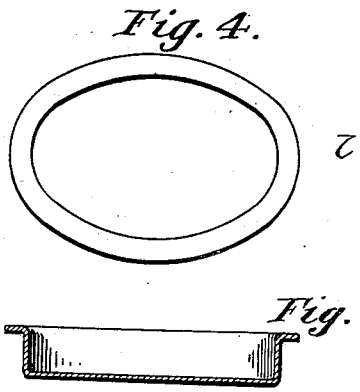
WITNESSES:
INVENTOR
G. R. Ford
BY
N. E. Nail
ATTORNEY

UNITED STATES PATENT OFFICE.

GEORGE R. FORD, OF HARTFORD, CONNECTICUT.

DISPLAY-STAND.                                    REISSUED

No. 910,659.          Specification of Letters Patent.         Patented Jan. 26, 1909.

Application filed July 29, 1908. Serial No. 445,902.

*To all whom it may concern:*

Be it known that I, GEORGE R. FORD, a citizen of the United States, and a resident of Hartford, in the county of Hartford and State of Connecticut, have invented certain new and useful Improvements in Display-Stands, of which the following is a specification.

The object of my invention is to produce a device of the character described by means of which different products or articles can be displayed in attractive form for the inspection of prospective customers and in such a way as to avoid the necessity of handling the article to permit of the free inspection of all parts of it.

In the drawings—Figure 1 is a perspective view of my stand. Fig. 2 is a detail view of the holder. Fig. 3 is a detail side view of the clip. Fig. 4 is a plan view of the plate. Fig. 5 is a side sectional view of the plate.

The device illustrated is designed particularly for displaying meat, as for instance the ham ends, in such a way that all parts of the ham can be inspected without handling the meat.

In the drawings $a$ is the frame which can be made in any desired shape and is suitably supported with the display part preferably inclined as illustrated. The holders are shown as arranged in two rows one above the other; they can of course be arranged in any way which may strike the fancy of the user. Extending from side to side of the frame is a bar $b$ on which the holders are pivotally supported.

$c$ is the holder having a hub $d$ pierced to fit on the bar $b$.

$e$ is a set-screw in the hub whose end is adapted to enter the circular groove $b'$ in the bar to position the holder against lengthwise movement on the bar and at the same time allow it to be turned on the bar.

The holder $c$ comprises in addition to the hub $d$ a pair of arms $f f'$, one of which as $f$ is shown secured at one end to the holder and at the other end carries a clip $g$ having engaging projections $g'$. The other arm $f'$ is pivoted to the hub $d$ at one end, its opposite end being held by one of the engaging projections $g'$ on the clip $g$. It will be noted that the arms are bowed to produce an approximately circular opening between them and that the size of this opening can be varied by swinging the pivoted arm into engagement with different engaging projections $g'$. A rest-bar $h$ extends from side to side of the frame to support the lower end of the holder.

The manner of use of the device is well shown in the drawings. The opening between the arms is always a little smaller than the largest part of the meat which is to be displayed so that the meat is held with its larger end exposed. If the under part of the piece of meat is to be examined the entire holder can be rocked on the bar $b$ so that the under part of the meat can be easily seen.

If it is desired to display a slice of meat then I provide a plate $i$, the body of which will fit between the arms of the holder, the flange of the plate resting on these arms.

I claim as my invention:

1. In a display stand the combination with the frame, of a suporting bar extending from side to side thereof, one or more holders pivotally mounted on said supporting bar, said holders comprising oppositely bowed arms, means for varying the size of the opening between said arms, and means for supporting the lower end of said holder.

2. In a display stand the combination with the frame, of a supporting bar extending from side to side thereof, one or more holders pivotally mounted on said bar, said holders comprising a pair of oppositely bowed arms one of which is pivotally mounted, a clip on the other arm having engaging projections to hold said pivoted bar in any desired position of adjustment.

3. In a display stand the combination with the frame, of a supporting bar extending from side to side thereof, a holder comprising a hub pierced to fit said bar, said hub being held against lengthwise movement along said bar but adapted to rock thereon, a pair of oppositely bowed arms secured at one end to said hub, means for securing the opposite ends of said arms together in different positions of adjustment, and a support for the lower end of said holder.

GEORGE R. FORD.

Witnesses:
  D. I. KREIMENDAHL,
  H. E. HART.